US010795370B2

(12) United States Patent
Izumori

(10) Patent No.: US 10,795,370 B2
(45) Date of Patent: Oct. 6, 2020

(54) TRAVEL ASSIST APPARATUS

(71) Applicant: SUBARU CORPORATION, Tokyo (JP)

(72) Inventor: Masayuki Izumori, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 193 days.

(21) Appl. No.: 16/040,430

(22) Filed: Jul. 19, 2018

(65) Prior Publication Data
US 2019/0072970 A1 Mar. 7, 2019

(30) Foreign Application Priority Data
Sep. 1, 2017 (JP) ................. 2017-168587

(51) Int. Cl.
G05D 1/02 (2020.01)
G01S 13/931 (2020.01)
(Continued)

(52) U.S. Cl.
CPC ..... *G05D 1/0214* (2013.01); *B60W 30/18163* (2013.01); *G01S 7/41* (2013.01);
(Continued)

(58) Field of Classification Search
CPC ......... B60W 2420/42; B60W 2420/52; B60W 2520/10; B60W 2520/14; B60W 2554/80;
(Continued)

(56) References Cited

U.S. PATENT DOCUMENTS 4,786,164 A * 11/1988 Kawata ................. G01S 17/931
356/5.05
6,388,565 B1 * 5/2002 Bernhard ............... B60Q 9/008
340/435
(Continued)

FOREIGN PATENT DOCUMENTS

JP 2001-357497 A 12/2001
JP 2003-276543 A 10/2003
(Continued)

OTHER PUBLICATIONS

Japanese Office Action issued in corresponding Japanese Patent Application No. 2017-168587, dated Apr. 16, 2019, with English Translation.
(Continued)

Primary Examiner — Babar Sarwar
(74) Attorney, Agent, or Firm — McDermott Will & Emery LLP

(57) ABSTRACT

A travel assist apparatus includes a calculator that calculates rear lane shape information in a section from a current position of the own vehicle to a rear position, on the basis of a lane information group and a traveling trajectory of the own vehicle. The lane information group includes pieces of lane information detected on the basis of images captured by an imaging unit successively during a data acquisition period. The pieces of lane information each includes information regarding relative positions of lanes with respect to an own vehicle. The data acquisition period is a predetermined period from a current time to a certain time in past. The traveling trajectory of the own vehicle is that during the data acquisition period and is calculated on the basis of a result of detection of both a vehicle speed and a yaw rate of the own vehicle during the data acquisition period.

5 Claims, 7 Drawing Sheets

(51) Int. Cl.
*B60W 30/18* (2012.01)
*G01S 7/41* (2006.01)

(52) U.S. Cl.
CPC .......... *G01S 13/931* (2013.01); *G05D 1/0251* (2013.01); *G05D 1/0257* (2013.01); *B60W 2520/10* (2013.01); *B60W 2520/14* (2013.01); *B60W 2554/801* (2020.02); *B60W 2555/60* (2020.02); *G01S 2013/932* (2020.01)

(58) Field of Classification Search
CPC ....... B60W 2554/801; B60W 2555/60; B60W 30/18145; B60W 30/18163; G01S 13/931; G01S 2013/932; G01S 7/41; G05D 1/0214; G05D 1/0251; G05D 1/0257

See application file for complete search history.

(56) References Cited

U.S. PATENT DOCUMENTS

| | | | | |
|---|---|---|---|---|
| 9,934,690 | B2* | 4/2018 | Kuroda | G06K 9/00798 |
| 2002/0087269 | A1* | 7/2002 | Sasaki | B60R 1/00 701/301 |
| 2004/0193347 | A1* | 9/2004 | Harumoto | B60T 8/1755 701/45 |
| 2008/0055114 | A1* | 3/2008 | Kim | G01S 15/86 340/937 |
| 2009/0157273 | A1* | 6/2009 | Kim | B60W 50/0098 701/70 |
| 2010/0185390 | A1* | 7/2010 | Monde | G01C 21/26 701/532 |
| 2011/0130936 | A1* | 6/2011 | Noda | G08G 1/163 701/70 |
| 2012/0277957 | A1* | 11/2012 | Inoue | G08G 1/167 701/41 |
| 2012/0296522 | A1* | 11/2012 | Otuka | G08G 1/167 701/41 |
| 2014/0188345 | A1* | 7/2014 | Tamura | B62D 15/025 701/42 |
| 2014/0244157 | A1* | 8/2014 | Tan | G01C 21/3658 701/423 |
| 2014/0343792 | A1* | 11/2014 | Akiyama | B60W 10/20 701/41 |
| 2015/0029012 | A1* | 1/2015 | Mitani | G06K 9/00805 340/436 |
| 2017/0053533 | A1* | 2/2017 | Kuroda | G01S 13/931 |

FOREIGN PATENT DOCUMENTS

| | | |
|---|---|---|
| JP | 2015-069217 A | 4/2015 |
| JP | 2015-161967 A | 9/2015 |
| JP | 2017-016226 A | 1/2017 |
| WO | 2015/194371 A1 | 12/2015 |
| WO | 2016/024316 A1 | 2/2016 |

OTHER PUBLICATIONS

Japanese Notice of Reasons for Refusal issued in corresponding Japanese Patent Application No. 2017-168587, dated Nov. 12, 2019, with English translation.

* cited by examiner

TRAVEL ASSIST APPARATUS

CROSS-REFERENCE TO RELATED APPLICATIONS

The present application claims priority from Japanese Patent Application No. 2017-168587 filed on Sep. 1, 2017, the entire contents of which are hereby incorporated by reference.

BACKGROUND

The technology relates to a travel assist apparatus to be mounted on a vehicle provided with a radar unit.

Japanese Unexamined Patent Application Publication No. 2015-69217 discloses a technique to determine, by a drive assist apparatus mounted on a vehicle provided with a radar unit, whether a lane change of the own vehicle is performable, on the basis of a result of recognition of any other vehicle around the own vehicle by the radar unit.

SUMMARY

An aspect of the technology provides a travel assist apparatus that includes a detector, a calculator, a first determining unit, and a second determining unit. The detector is configured to at least recognize, on the basis of a road sign in an image, an own vehicle traveling lane and one or two own vehicle adjacent lanes, and detect lane information including information regarding relative positions, of the own vehicle traveling lane and all of the one or two own vehicle adjacent lanes, with respect to an own vehicle in a vehicle width direction. The image is captured by an imaging unit that captures a front region of the own vehicle. The own vehicle traveling lane is a lane in which the own vehicle is traveling. The one or two own vehicle adjacent lanes are each a lane adjacent to the own vehicle traveling lane. The calculator is configured to calculate rear lane shape information on the basis of a lane information group and a traveling trajectory of the own vehicle. The lane information group includes a plurality of pieces of the lane information detected on the basis of a plurality of images captured by the imaging unit successively during a data acquisition period. The data acquisition period is a predetermined period from a current time to a certain time in past. The traveling trajectory of the own vehicle is a trajectory of traveling of the own vehicle during the data acquisition period and is calculated on the basis of a result of detection of both a vehicle speed of the own vehicle and a yaw rate of the own vehicle during the data acquisition period. The rear lane shape information includes information regarding shapes of the own vehicle traveling lane and all of the one or two own vehicle adjacent lanes in a section that covers from a current position of the own vehicle to a rear position. The rear position is located in a rear region of the own vehicle and is away from the current position of the own vehicle by a predetermined distance. The first determining unit is configured to determine which of the own vehicle traveling lane and all of the one or two own vehicle adjacent lanes another vehicle is traveling in, on the basis of a comparison between the rear lane shape information and a relative position of the other vehicle with respect to the own vehicle. The relative position of the other vehicle with respect to the own vehicle is detected by a radar unit having a recognizable range covering the rear region of the own vehicle. The second determining unit is configured to determine whether a lane change of the own vehicle is performable, on the basis of information indicating a result of the determination made by the first determining unit, a relative speed of the other vehicle with respect to the own vehicle, and a separation distance from the other vehicle to the own vehicle. The relative speed and the separation distance are detected by the radar unit.

An aspect of the technology provides a travel assist apparatus that includes circuitry. The circuitry is configured to at least recognize, on the basis of a road sign in an image, an own vehicle traveling lane and one or two own vehicle adjacent lanes, and detect lane information including information regarding relative positions, of the own vehicle traveling lane and all of the one or two own vehicle adjacent lanes, with respect to an own vehicle in a vehicle width direction. The image is captured by an imaging unit that captures a front region of the own vehicle. The own vehicle traveling lane is a lane in which the own vehicle is traveling. The one or two own vehicle adjacent lanes are each a lane adjacent to the own vehicle traveling lane. The circuitry is configured to calculate rear lane shape information on the basis of a lane information group and a traveling trajectory of the own vehicle. The lane information group includes a plurality of pieces of the lane information detected on the basis of a plurality of images captured by the imaging unit successively during a data acquisition period. The data acquisition period is a predetermined period from a current time to a certain time in past. The traveling trajectory of the own vehicle is a trajectory of traveling of the own vehicle during the data acquisition period and is calculated on the basis of a result of detection of both a vehicle speed of the own vehicle and a yaw rate of the own vehicle during the data acquisition period. The rear lane shape information includes information regarding shapes of the own vehicle traveling lane and all of the one or two own vehicle adjacent lanes in a section that covers from a current position of the own vehicle to a rear position. The rear position is located in a rear region of the own vehicle and is away from the current position of the own vehicle by a predetermined distance. The circuitry is configured to determine which of the own vehicle traveling lane and all of the one or two own vehicle adjacent lanes another vehicle is traveling in, on the basis of a comparison between the rear lane shape information and a relative position of the other vehicle with respect to the own vehicle. The relative position of the other vehicle with respect to the own vehicle is detected by a radar unit having a recognizable range covering the rear region of the own vehicle. The circuitry is configured to determine whether a lane change of the own vehicle is performable, on the basis of information indicating a result of the determination made as to which of the own vehicle traveling lane and all of the one or two own vehicle adjacent lanes another vehicle is traveling in, a relative speed of the other vehicle with respect to the own vehicle, and a separation distance from the other vehicle to the own vehicle. The relative speed and the separation distance are detected by the radar unit.

DETAILED DESCRIPTION

Figure 1:
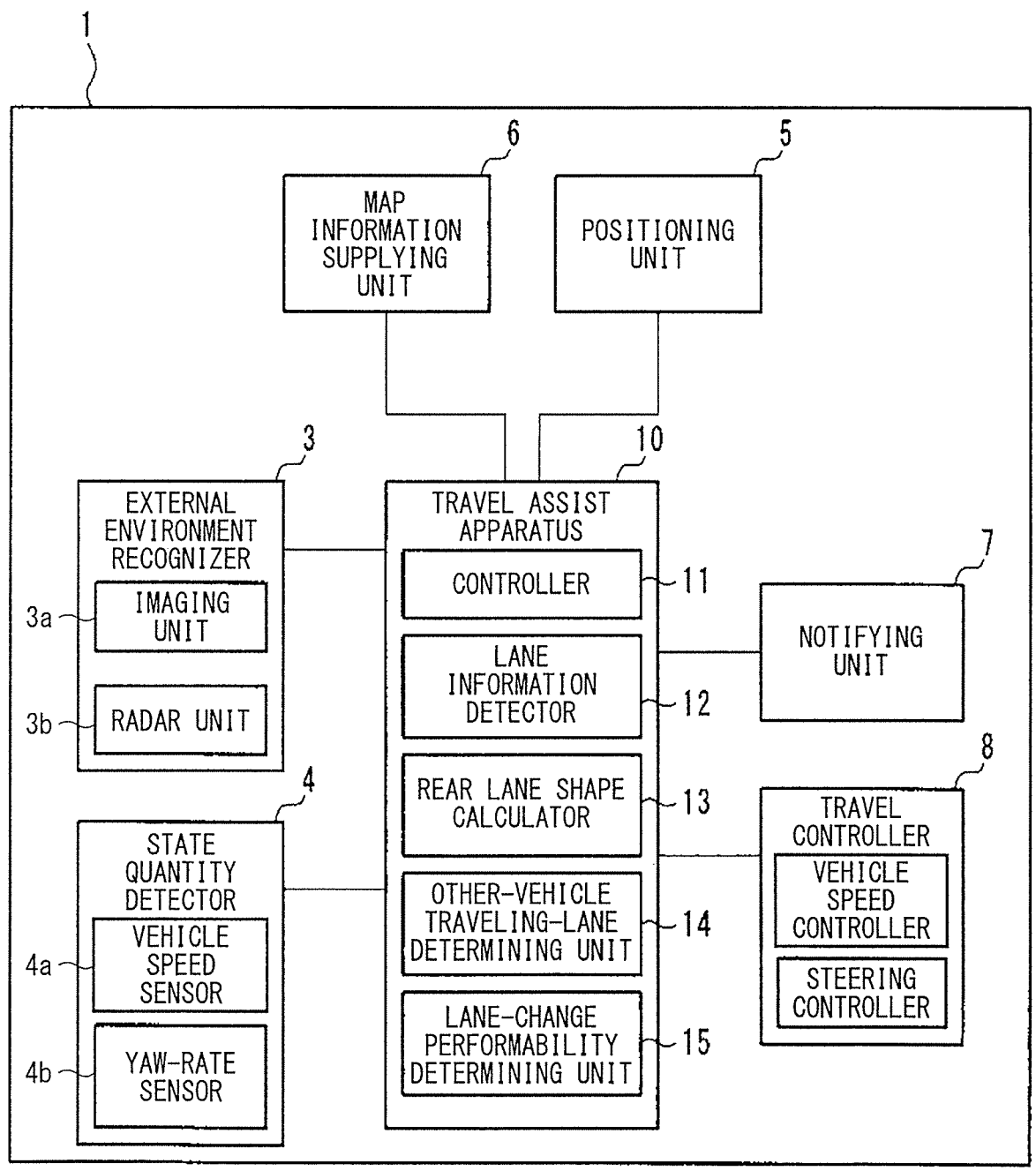
FIG. 1 is a block diagram illustrating an example of a configuration of a travel assist apparatus.

In the following, some implementations of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example implementations which are not recited in a most-generic independent claim of the disclosure are optional and may be provided on an as-needed basis. Throughout the present specification and the drawings, elements having substantially the same function and configuration are denoted with the same numerals to avoid any redundant description.

When an own vehicle is traveling on a road having a plurality of lanes, it may become difficult for a radar unit in some cases to determine which of the lanes a follower vehicle is traveling in. For example, when the own vehicle is traveling on a road curved leftward, a follower vehicle that is traveling in a lane on right side of a lane in which the own vehicle is traveling can sometimes be located just behind the own vehicle. In this case, it is difficult to determine which of the lanes the follower vehicle is traveling in only by means of the radar unit.

Accordingly, it is desired to allow for determination as to which lane a follower vehicle is traveling in upon recognition of the follower vehicle by a radar unit, and to thereby improve user-friendliness.

It is desirable to provide a travel assist apparatus that makes it possible to improve user-friendliness.

A travel assist apparatus 10 according to an example implementation of the technology may be an electronic apparatus to be mounted on a vehicle 1, and may supply information directed to assistance of traveling of the vehicle 1 under any of automatic driving and manual driving. As will be described below, the travel assist apparatus 10 may recognize a traveling state of another vehicle that is traveling in any of a rear region and a side region of the vehicle 1, determine whether it is possible for the vehicle 1 to safely perform a lane change at present, and supply lane change performability information including information regarding a result of the determination.

In an example case where the vehicle 1 is traveling under automatic driving, the lane change performability information may be used to determine when to perform a lane change of the vehicle 1. In an example case where the vehicle 1 is traveling under manual driving, the lane change performability information may be used to notify a driver of the vehicle 1 who is to perform a lane change operation, of whether a safe lane change is performable. Accordingly, the travel assist apparatus 10 is mountable on any vehicle with or without an automatic driving function.

In an example implementation, the travel assist apparatus 10 may be mounted on the vehicle 1 that is able to perform automatic driving, for example. Further, in an example implementation, the travel assist apparatus 10 may also serve as an automatic traveling controller that controls the automatic driving of the vehicle 1. In other words, part of functions of the automatic controller may supply the lane change performability information of the travel assist apparatus 10.

The travel assist apparatus 10 may include a controller 11 including a computer in which a component such as a central processing unit (CPU), a read-only memory (ROM), a random-access memory (RAM), or an input-output device is connected to a bus. The controller 11 may control the travel assist apparatus 10 on the basis of a predetermined program.

The vehicle 1 includes, other than the travel assist apparatus 10, an external environment recognizer 3, a state quantity detector 4, a positioning unit 5, a map information supplying unit 6, a notifying unit 7, and a travel controller 8. The external environment recognizer 3, the state quantity detector 4, the positioning unit 5, the map information supplying unit 6, the notifying unit 7, and the travel controller 8 may be electrically coupled to the travel assist apparatus 10 to perform mutual information communication.

The external environment recognizer 3 may detect, for example, a shape of a road in a front region of the vehicle 1, a relative speed of an object around the vehicle 1 with respect to the vehicle 1, a relative position of the object around the vehicle 1 with respect to the vehicle 1, and any other suitable information. In an example implementation, the external environment recognizer 3 may include an imaging unit 3a that captures an image of the front region of the vehicle 1, and a radar unit 3b whose recognizable range covers at least a rear region of the vehicle 1.

The imaging unit 3a may be, for example, a monocular camera that captures an image from a single point of view, may be a stereoscopic camera that captures images having a parallax from a plurality of points of view, or may be any other camera that captures an image of the front region of the vehicle 1. The imaging unit 3a may capture images in a predetermined cycle, e.g., at a predetermined frame rate. It is to be noted that the cycle in which the imaging unit 3a captures images may be variable.

The radar unit 3b may detect one or a plurality of vehicles that travel in any of the rear region and the side region of the vehicle 1 on a road on which the vehicle 1 is traveling. Further, the radar unit 3b may detect a relative position of the other vehicle with respect to the vehicle 1 and a relative speed of the other vehicle with respect to the vehicle 1. It is to be noted that the radar unit 3b may be able to detect a plurality of vehicles other than the vehicle 1. The relative position of any other vehicle with respect to the vehicle 1 may be based on a positional relationship on a road surface, and may be calculated on the basis of an azimuth relative to the vehicle 1 and a distance from the other vehicle to the vehicle 1. In one example, the radar unit 3b may be LiDAR. In one example, the radar unit 3b may be so located that the recognizable range of the radar unit 3b also covers the front region of the vehicle 1.

In an example implementation, an existing technique of an external environment recognizer provided with an imaging unit and a radar unit may be applicable, which will not be described further in greater detail.

The state quantity detector 4 may detect a state quantity representing a traveling state of the vehicle 1. The state quantity detector 4 may include a vehicle speed sensor 4a and a yaw-rate sensor 4b. The vehicle speed sensor 4a may detect a vehicle speed of the vehicle 1. The yaw-rate sensor 4b may detect a yaw rate of the vehicle 1.

The positioning unit 5 may detect a current position of the vehicle 1 by means of one or more of a satellite positioning system of the vehicle 1, an inertial navigation device, and road-to-vehicle communication. In one example, the current position of the vehicle 1 may be represented by latitude and longitude of the vehicle 1.

The map information supplying unit 6 may include a storage that holds map information, and supply the map information. The map information may include pieces of information regarding a shape of a road such as a road curvature, a gradient of a longitudinal cross-section of the road, or a condition of an intersection of the road and another road.

The notifying unit 7 may include, for example, a display that displays contents such as an image or a text, a light-emitting device that emits light, a speaker that outputs a sound, a vibrator that generates vibration, or any combination thereof. The notifying unit 7 may supply, by means of any of the foregoing devices, information to a user of the vehicle 1 from an electronic apparatus such as the travel assist apparatus 10. The user of the vehicle 1 may be a driver, for example.

The travel controller 8 may include a vehicle speed controller and a steering controller. The vehicle speed controller may control variation in output of a power generator of the vehicle 1 and variation in braking force of a braking unit of the vehicle 1 to control a traveling speed of the vehicle 1. The steering controller may control variation in steering angle of the vehicle 1.

The controller 11 of the travel assist apparatus 10 may control, when the vehicle 1 is traveling under the automatic driving, the traveling speed and the steering angle of the vehicle 1 via the travel controller 8 on the basis of results of recognition performed by the external environment recognizer 3 and the state quantity detector 4. It is to be noted that, in an example implementation, an existing basic configuration directed to vehicle automatic driving may be applicable, which will not be described further in detail.

A description is given next of an operation of the controller 11 of the travel assist apparatus 10. The controller 11 may include a lane information detector 12, a rear lane shape calculator 13, an other-vehicle traveling-lane determining unit 14, and a lane-change performability determining unit 15. The foregoing units included in the controller 11 may be implemented as separate hardware executing each function, or may be implemented as software that allows each function to be achieved by the CPU executing a predetermined program. In one implementation, the lane information detector 12 may serve as a "detector". In one implementation, the rear lane shape calculator 13 may serve as a "calculator". In one implementation, the other-vehicle traveling-lane determining unit 14 may serve as a "first determining unit". In one implementation, the lane-change performability determining unit 15 may serve as a "second determining unit".

The lane information detector 12 may recognize one or more boundaries of a plurality of lanes included in a road on which the vehicle 1 is traveling, on the basis of a result of recognition of a road sign in an image captured by the imaging unit 3a. For example, the lane information detector 12 may recognize, as a boundary of one lane against another lane, a road sign provided on a road surface along a boundary on right or left side of the lane to indicate the lane. The road sign may have, for example, a linear shape, a dashed-line shape, or any other shape that is suitable to indicate a lane.

Further, the lane information detector 12 may at least recognize, on the basis of a result of the recognition of the boundaries of the lanes included in the road on which the vehicle 1 is traveling, a lane in which the vehicle 1 is traveling and one or two lanes adjacent to the lane in which the vehicle 1 is traveling.

Hereinafter, the lane in which the vehicle 1 is traveling may be referred to as an "own vehicle traveling lane", and a lane adjacent to the own vehicle traveling lane may be referred to as an "own vehicle adjacent lane". How many own vehicle adjacent lanes are present may change depending on how many lanes are included in the road on which the vehicle 1 is traveling, or may change depending on which lane, in the road, the vehicle 1 is traveling in. When only one own vehicle adjacent lane is present, the lane information detector 12 may further recognize whether the own vehicle adjacent lane is on right or left side of the own vehicle traveling lane. It is to be noted that, when the road on which the vehicle 1 is traveling includes four or more lanes, the lane information detector 12 may recognize all of the four or more lanes.

Further, the lane information detector 12 may also recognize a relative position, of each of right and left boundaries of the own vehicle traveling lane, with respect to the vehicle 1 in the vehicle width direction. For example, the lane information detector 12 may recognize a position of each of the right and left boundaries of the own vehicle traveling lane in the vehicle width direction on a coordinate system that is provided on a plane substantially parallel to the road surface and has an origin set at the position of the vehicle 1. When any own vehicle adjacent lane is present, the right and left boundaries of the own vehicle traveling lane may be considered as information indicating a relative position of the own vehicle adjacent lane with respect to the vehicle 1 in the vehicle width direction. In other words, the lane information detector 12 may recognize information of the relative positions of the own vehicle traveling lane and all of the one or two own vehicle adjacent lanes with respect to the vehicle 1 in the vehicle width direction. Such recognition by the lane information detector 12 may be performed on the basis of the result of the recognition of the road sign in the image captured by the imaging unit 3a.

It is to be noted that, in an example implementation, the lane information detector 12 may recognize a boundary, of the own vehicle adjacent lane, on side opposite to the own vehicle traveling lane. In other words, the lane information detector 12 may also recognize a width of the own vehicle adjacent lane in addition to the width of the own vehicle traveling lane. In another implementation, the lane information detector 12 may recognize relative positions of boundaries of all of the lanes with respect to the vehicle 1.

As described above, the lane information detector 12 may at least recognize, on the basis of the road sign in the image captured by the imaging unit 3a, the own vehicle traveling lane and the one or two own vehicle adjacent lanes, and detect lane information including information regarding relative positions of the own vehicle traveling lane and all of the one or two own vehicle adjacent lanes with respect to the vehicle 1 in the vehicle width direction.

Figure 2:
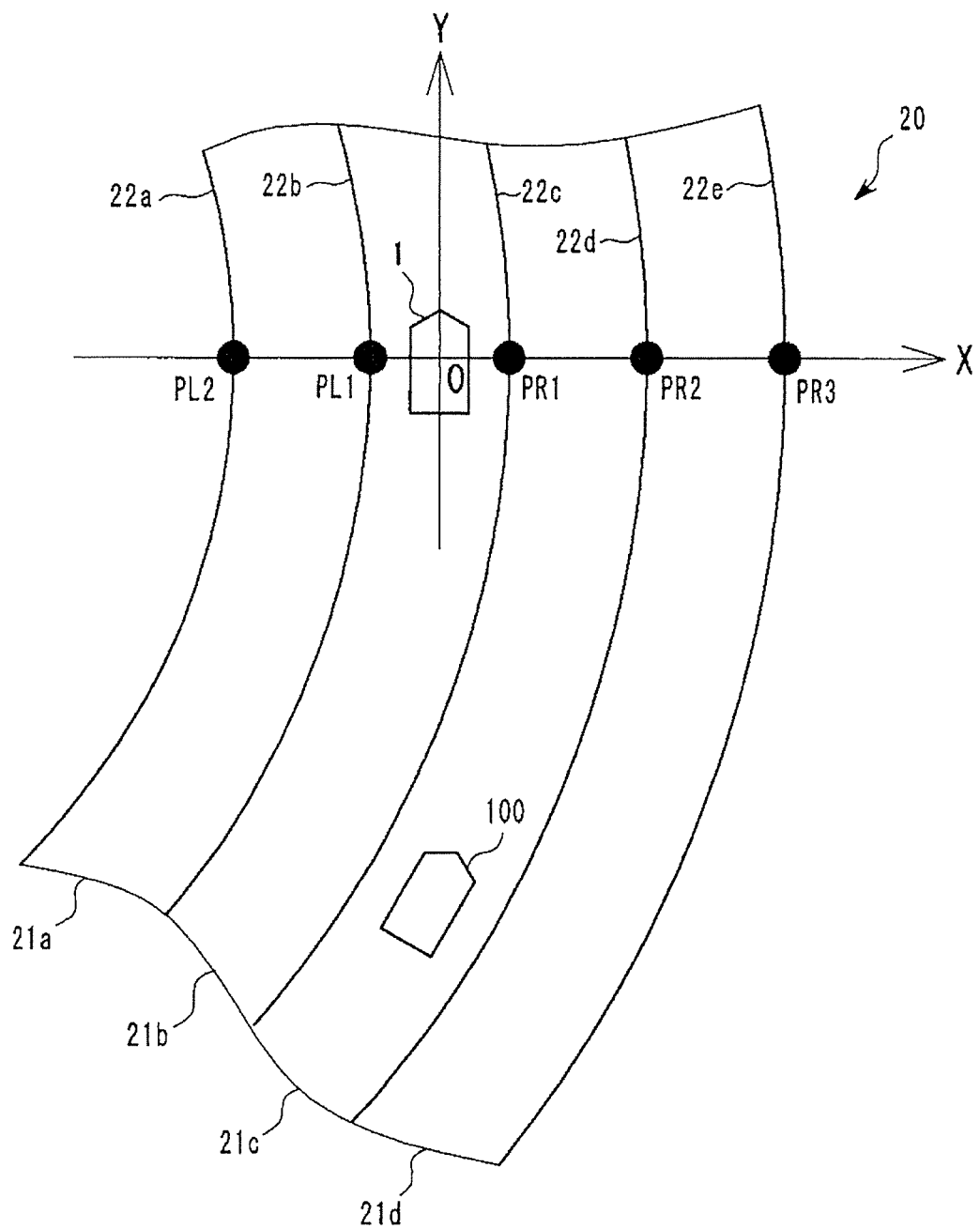
FIG. 2 is a diagram illustrating a situation as seen from above in which an own vehicle is traveling on a road having a plurality of lanes.

For description purpose, FIG. 2 is referred that illustrates an example case in which the vehicle 1 is traveling on a road 20 that includes four lanes, i.e., a first lane 21a, a second lane 21b, a third lane 21c, and a fourth lane 21d in order from left in a traveling direction of the vehicle 1. It is assumed that all of the lanes in the road 20 illustrated in FIG. 2 have substantially the same traffic direction. As illustrated in FIG. 2, the road including four lanes typically has five road signs to indicate the boundaries of the respective four lanes. The road signs illustrated in FIG. 2 are a first lane line 22a, a second lane line 22b, a third lane line 22c, a fourth lane line 22d, and a fifth lane line 22e in order from the left where the first lane line 22a is the road sign indicating the left boundary of the first lane line 21a.

For example, when the vehicle 1 is traveling in the second lane 21b as illustrated in FIG. 2, the lane information detector 12 may recognize at least a position PL1 and a position PR1. The position PL1 is a relative position of the second lane line 22b, serving as the left boundary of the second lane 21b, with respect to the vehicle 1 in the vehicle width direction. The position PR1 is a relative position of the third lane line 22c, serving as the right boundary of the second lane 21b, with respect to the vehicle 1 in the vehicle width direction. In other words, the position PL1 is a position of the road sign that indicates a boundary of a first lane on the left side of the vehicle 1, and the position PR1 is a position of the road sign that indicates a boundary of a first lane on the right side of the vehicle 1. Further, the lane information detector 12 may supply, as lane information, information regarding at least the positions PL1 and PR1, together with information regarding times of recognition of the respective positions PL1 and PR1.

As described above, in an example implementation, the lane information detector 12 may recognize positions PL2, PL3, PL4, and so forth and positions PR2, PR3, PR4, and so forth to supply information regarding the foregoing positions as the lane information. The positions PL2, PL3, PL4, and so forth may be positions of the road signs indicating respective boundaries of the second and subsequent lanes on the left side of the vehicle 1. The positions PR2, PR3, PR4, and so forth may be positions of the road signs indicating respective boundaries of the second and subsequent lanes on the right side of the vehicle 1.

In one example according to an implementation of the technology, the lane information detector 12 may supply, as the lane information, information regarding positions of the road signs indicating boundaries of all of the lanes that are recognizable on the basis of the image captured by the imaging unit 3a. In one example, the lane information detector 12 may supply the lane information in a cycle of a predetermined time period Δt. The predetermined time period Δt that is the cycle of the lane information supply performed by the lane information detector 12 may be substantially the same as an image capturing cycle of the imaging unit 3a, or the integral multiple thereof.

FIG. 2 illustrates an X-Y coordinate system, i.e., an orthogonal coordinate system that is provided on a plane substantially parallel to the road surface and has an origin set at a predetermined position of the vehicle 1. An X-axis may extend substantially parallel to the vehicle width direction of the vehicle 1, and a Y-axis may extend substantially parallel to a front-rear direction of the vehicle 1, i.e., the traveling direction of the vehicle 1. In an example implementation, the lane information detector 12 may supply, as the lane information, an X-coordinate value of a position, on the road sign, having a Y-coordinate value of 0 (zero).

As illustrated in FIG. 2, when the vehicle 1 is traveling in the second lane 21b of the road having the four lanes, the lane information detector 12 may supply information regarding the position PL2 of the first lane line 22a, the position PL1 of the second lane line 22b, the position PR1 of the third lane line 22c, the position PR2 of the fourth lane line 22d, and the position PR3 of the fifth lane line 22e.

The rear lane shape calculator 13 may detect a lane shape in the rear region of the vehicle 1, and supply information regarding the lane shape in the rear region of the vehicle 1 as rear lane shape information. As used herein, the wording the "lane shape in the rear region of the vehicle 1" and its variations encompass at least shapes of the own vehicle traveling lane and of all of the one or two own vehicle adjacent lanes in a section, on the road on which the vehicle 1 is traveling, from the current position of the vehicle 1 to a position in the rear region of the vehicle 1 that is away by a predetermined distance from the current position of the vehicle 1. The position in the rear region of the vehicle 1 that is away by the predetermined distance from the current position of the vehicle 1 may be hereinafter referred to as a "predetermined rear position". In one example, the distance within which the lane shape is detected by the rear lane shape calculator 13 may be substantially equivalent to or greater than a distance corresponding to the recognizable range of the radar unit 3b.

A method of detecting the lane shape in the rear region of the vehicle 1 by the rear lane shape calculator 13 is not particularly limited. For example, the rear lane shape calculator 13 may detect the lane shape in the rear region of the vehicle 1 on the basis of the current position of the vehicle 1 and the map information including information regarding the number of lanes, information regarding the shapes of the lanes, or any other information regarding the lanes. In another example, the rear lane shape calculator 13 may detect the lane shape in the rear region of the vehicle 1 on the basis of a captured image of the rear region of the vehicle 1.

In one example of an implementation of the technology, the rear lane shape calculator 13 may detect the lane shape in the section from the current position of the vehicle 1 to the predetermined rear position, on the basis of a lane information group, and a traveling trajectory of the vehicle 1. The lane information group may include a plurality of pieces of the lane information detected during a data acquisition period. The traveling trajectory of the vehicle 1 may be calculated on the basis of results of detection performed by the vehicle speed sensor 4a and the yaw-rate sensor 4b during the data acquisition period. The data acquisition period may be a predetermined period from the current time to a certain time in the past.

For example, the rear lane shape calculator 13 in an example implementation may calculate variation in traveling distance of the vehicle 1 and variation in traveling direction of the vehicle 1 in a period from a time of detection of one piece of lane information to a time of detection of a subsequent piece of lane information. Such calculation may be performed on the basis of the results of detection performed by the vehicle speed sensor 4a and the yaw-rate sensor 4b. The traveling direction of the vehicle 1 may be, for example, an azimuth of the vehicle 1. Further, the rear lane shape calculator 13 may temporarily hold results of the calculation.

Figure 3:
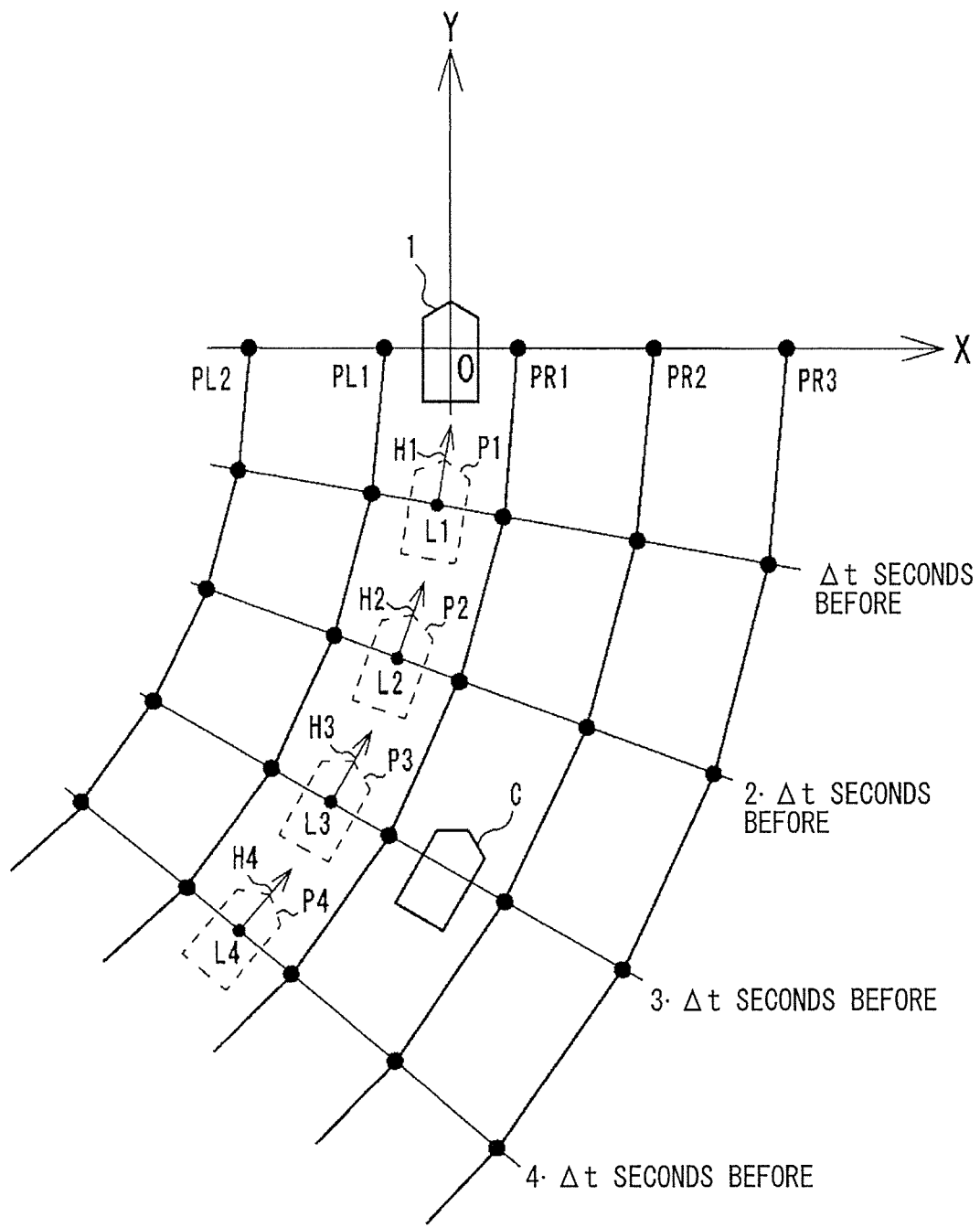
FIG. 3 is a diagram in which a trajectory of traveling of the own vehicle in the past and lane information are plotted on an orthogonal coordinate system having an origin set to a position of the own vehicle.

In other words, the rear lane shape calculator 13 may calculate a relative variation amount of the position of the vehicle 1 at the time in the past of the detection of the lane information with respect to the current position of the vehicle 1, and calculate a relative variation amount of the traveling direction of the vehicle 1 at the time in the past of the detection of the lane information with respect to the current traveling direction of the vehicle 1. Further, the rear lane shape calculator 13 may temporarily hold results of the calculation. The relative variation amounts of the position and the traveling direction of the vehicle 1 at the time in the past of the detection of the lane information may be plotted on the coordinate system that is provided on the plane substantially parallel to the road surface and has the origin set at the position of the vehicle 1, as illustrated in FIG. 3. This may provide the traveling trajectory of the vehicle 1 during the data acquisition period.

FIG. 3 illustrates an X-Y coordinate system that is provided on the plane substantially parallel to the road surface and has an origin set at the position of the vehicle 1 at the current time. An X-axis may extend substantially parallel to the vehicle width direction of the vehicle 1, and a Y-axis may extend substantially parallel to a front-rear direction of the vehicle 1, i.e., the traveling direction of the vehicle 1. In FIG. 3, P1 indicates a position L1 and a traveling direction H1 of the vehicle 1 at a time, Δt seconds before the current time, at which the lane information has been detected. Similarly, P2 indicates a position L2 and a traveling direction H2 of the vehicle 1 at a time, 2·Δt seconds before the current time, at which the lane information has been detected. This is similarly applicable to what are indicated by P3, P4, and so forth.

Further, the rear lane shape calculator 13 may plot, on the X-Y coordinate system, the lane information detected in a certain time in the past in correspondence with the position and the traveling direction of the vehicle 1 at the certain time. The lane information may be the relative position of the road sign, indicating the boundary of the lane, with respect to the vehicle 1 in the vehicle width direction, as described above.

For example, to plot the lane information detected Δt seconds before the current time on the X-Y coordinate system, the rear lane shape calculator 13 may plot the relative position, with respect to the vehicle 1, of the road sign recognized Δt seconds before and indicating the boundary of the lane, on a straight line substantially orthogonal to the traveling direction H1 of the vehicle 1 Δt seconds before, using the position L1 of the vehicle 1 Δt seconds before as a reference.

When the vehicle 1 is traveling in the second lane 21b of the road having the four lanes as illustrated in FIG. 2, the rear lane shape calculator 13 may plot, on the X-Y coordinate system, the position PL2 of the first lane line 22a, the position PL1 of the second lane line 22b, the position PR1 of the third lane line 22c, the position PR2 of the fourth lane line 22d, and the position PR3 of the fifth lane line 22e, in correspondence with the position and the traveling direction of the vehicle 1 in the section, on the traveling trajectory, from the current position of the vehicle 1 to the predetermined rear position.

As illustrated in FIG. 3, a line connecting, in order of detection time, a plurality of points related to the same lane line out of the plurality of pieces of lane information plotted on the X-Y coordinate system may have an approximate shape of the lane shape in the rear region of the vehicle 1. The rear lane shape calculator 13 may supply the information regarding a line connecting the plurality of pieces of lane information related to the same lane line plotted on the X-Y coordinate system, as the rear lane shape information, i.e., the information regarding the lane shape in the rear region of the vehicle 1. It is to be noted that a line connecting points adjacent to each other out of the plurality of pieces of lane information related to the same lane line may be, for example, a straight line, or a curved line.

It is to be noted that, as the lane information is calculated on the basis of the road sign captured in the image, the lane information may be undetectable in some cases. For example, the lane information may be undetectable in a case where the road sign is hidden by another vehicle traveling along the vehicle 1, in a case where the road sign cannot be clearly recognized for a reason such as accumulated snow or worn sign, or in any other case that makes it difficult to capture the road sign. In an example implementation, in a case where a measurement error period is present in the data acquisition period, the rear lane shape calculator 13 may interpolate the lane information for the measurement error period on the basis of the lane information detected before the measurement error period. The measurement error period may be a period in which the lane information is undetectable by the lane information detector 12. Therefore, according to an example implementation, it is possible to detect the lane shape in the section from the current position of the vehicle 1 to the predetermined rear position also when the data acquisition period includes the measurement error period in which the lane information is undetectable.

The other-vehicle traveling-lane determining unit 14 may determine which of the lanes of the road each of one or more other vehicles 100 is traveling in. Such determination may be made on the basis of comparison between the rear lane shape information and a relative position of each of the one or more other vehicles 100 with respect to the vehicle 1. The relative position of each of the one or more other vehicles 100 with respect to the vehicle 1 may be detected by the radar unit 3b. It is to be noted that the one or more other vehicles 100 may each be a vehicle that is traveling, in a direction substantially the same as the traveling direction of the vehicle 1, on the road on which the vehicle 1 is traveling in any of the side region and the rear region of the vehicle 1.

As described above, the rear lane shape information may include information regarding the shapes of the plurality of road signs, e.g., the lane lines, indicating the boundaries of the lanes in a predetermined rear section of the vehicle 1. The other-vehicle traveling-lane determining unit 14 may plot, on the coordinate system, the rear lane shape information and a detected position C. of each of the one or more other vehicles 100 detected by the radar unit 3b. The coordinate system may be provided on a plane substantially parallel to the road surface and has an origin set at the position of the vehicle 1. Further, the other-vehicle traveling-lane determining unit 14 may determine the lane in which each of the one or more other vehicles 100 is traveling, on the basis of the relative position, with respect to the lane lines, of the detected position C of each of the one or more other vehicles 100.

Figure 4:
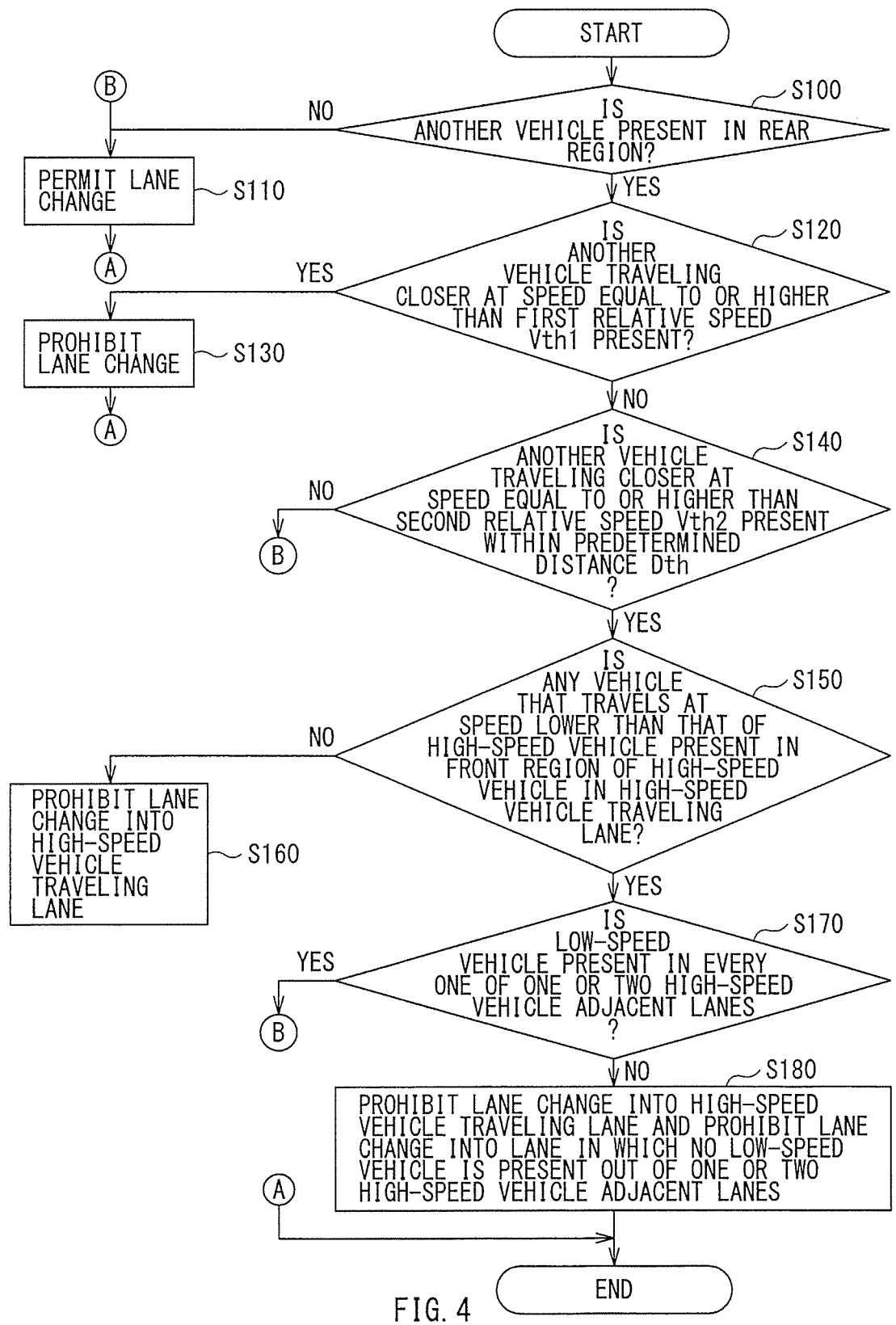
FIG. 4 is a flowchart illustrating an example of a lane change performability determination process.

The lane-change performability determining unit 15 may determine whether the lane change of the vehicle 1 is performable, on the basis of: information regarding which of the lanes each of the one or more other vehicles 100 is traveling in; the relative speed of each of the one or more other vehicles 100 with respect to the vehicle 1; and the separation distance from each of the one or more other vehicles 100 to the vehicle 1. Which of the lanes each of the one or more other vehicles 100 is traveling in may be determined by the other-vehicle traveling-lane determining unit 14. The relative speed of each of the one or more other vehicles 100 with respect to the vehicle 1, and the separation distance from each of the one or more other vehicles 100 to the vehicle 1 may be detected by the radar unit 3b. FIG. 4 illustrates a flowchart of an example of a lane change performability determination process to be performed by the lane-change performability determining unit 15.

The lane change performability determination process based on the flowchart illustrated in FIG. 4, which will be described later in greater detail, may be performed by the lane-change performability determining unit 15 on the basis of the positions and the speeds of the vehicle 1 and a follower vehicle. The follower vehicle may be any, of the one or more other vehicles 100, that travels closer to the vehicle 1 from the rear region of the vehicle 1. This lane change performability determination process may be directed to preventing the vehicle 1 from cutting in front of the follower vehicle as a result of a lane change to interrupt overtaking of the vehicle 1 by the follower vehicle.

Therefore, the lane change performability determination process to be performed by the lane-change performability determining unit 15 in accordance with the flowchart illustrated in FIG. 4 may only be part of a process of the controller 11 to determine whether a lane change is performable. Accordingly, even when the lane change is determined as being performable on the basis of the flowchart illustrated in FIG. 4, a result of this determination may be overwritten with a result of any other determination process, of the controller 11, that is higher in priority. For example, in a case where the presence of another vehicle in the side region of the vehicle 1 is recognized by the external environment recognizer 3 and contact of that vehicle and the vehicle 1 is expected as a result of a lane change, the controller 11 may determine that the lane change is non-performable irrespective of the result of the determination based on the flowchart illustrated in FIG. 4.

First, in step S100, the lane-change performability determining unit 15 may determine whether another vehicle 100 is present in the recognizable range of the radar unit 3b in any of the own vehicle traveling lane and the one or two own vehicle adjacent lanes in the rear region of the vehicle 1.

On a condition that no other vehicle 100 is determined as being present in the recognizable range of the radar unit 3b in step S100 (step S100: NO), the lane-change performability determining unit 15 may proceed to a process in step S110. In step S110, the lane-change performability determining unit 15 may determine that the lane change of the vehicle 1 is performable. It is to be noted that, even when the process in step S110 is performed, the lane change of the vehicle 1 may be determined as being non-performable in some cases on the basis of a result of recognition performed by any unit of the external environment recognizer 3 other than the radar unit 3b, as described above.

In contrast, on a condition that the other vehicle 100 is determined as being present in the recognizable range of the radar unit 3b in step S100 (step S100: YES), the lane-change performability determining unit 15 may proceed to a process in step S120.

In step S120, the lane-change performability determining unit 15 may determine whether another vehicle 100 that is traveling closer to the vehicle 1 at a speed equal to or higher than a predetermined first relative speed Vth1 is present in any of the own vehicle traveling lane and the one or two own vehicle adjacent lanes in the rear region of the vehicle 1. The first relative speed Vth1 may be, for example, in a range from about 30 km/h to about 40 km/h. In one example, the first relative speed Vth1 may be variable, and may be increased as the traveling speed of the vehicle 1 is increased.

On a condition that the other vehicle 100 that is traveling closer to the vehicle 1 at the speed equal to or higher than the predetermined first relative speed Vth1 is determined as being present in any of the own vehicle traveling lane and the one or two own vehicle adjacent lanes in the rear region of the vehicle 1 in step S120 (step S120: YES), the lane-change performability determining unit 15 may proceed to a process in step S130. In step S130, the lane-change performability determining unit 15 may determine that the lane change of the vehicle 1 is non-performable.

In other words, on the condition the other vehicle 100 that is traveling closer to the vehicle 1 at the speed equal to or higher than the predetermined first relative speed Vth1 is present in any of the own vehicle traveling lane and the one or two own vehicle adjacent lanes in the rear region of the vehicle 1 within the recognizable range of the radar unit 3b, the lane change of the vehicle 1 may be prohibited irrespective of the separation distance from the vehicle 1 to the other vehicle 100.

In contrast, on a condition that no other vehicle 100 that is traveling closer to the vehicle 1 at the speed equal to or higher than the predetermined first relative speed Vth1 is determined as being present in any of the own vehicle traveling lane and the one or two own vehicle adjacent lanes in the rear region of the vehicle 1 in step S120 (step S120: NO), the lane-change performability determining unit 15 may proceed to a process in step S140.

In step S140, the lane-change performability determining unit 15 may determine whether another vehicle 100 that is traveling closer to the vehicle 1 at a speed equal to or higher than a predetermined second relative speed Vth2 is present within a predetermined distance Dth in any of the own vehicle traveling lane and the one or two own vehicle adjacent lanes in the rear region of the vehicle 1.

The predetermined distance Dth may be smaller than a distance corresponding to the recognizable range of the radar unit 3b. In one example, the predetermined distance Dth may be variable, and may be increased as the traveling speed of the vehicle 1 is increased. The second relative speed Vth 2 may be lower than the first relative speed Vth1. The second relative speed Vth2 may be variable, and may be increased as the traveling speed of the vehicle 1 is increased.

Hereinafter, the other vehicle 100 that is traveling closer to the vehicle 1 at the speed equal to or higher than the predetermined second relative speed Vth2 within the predetermined distance Dth in the rear region of the vehicle 1 may be referred to as a "high-speed vehicle 100H". Accordingly, the determination in step 140 may be, in other words, determination as to whether the high-speed vehicle 100H is present in the rear region of the vehicle 1.

On a condition that no high-speed vehicle 100H is determined as being present in any of the own vehicle traveling lane and the one or two own vehicle adjacent lanes in the rear region of the vehicle 1 in step S140 (step S140: NO), the lane-change performability determining unit 15 may proceed to the process in step S110. In step S110, the lane-change performability determining unit 15 may determine that the lane change of the vehicle 1 is performable.

In other words, the lane change of the vehicle 1 may be permitted on a condition that respective speeds of all of the one or more other vehicles 100 traveling closer to the vehicle 1 within the predetermined distance Dth in the rear region of the vehicle 1 are lower than the second relative speed Vth2.

In contrast, on a condition that the high-speed vehicle 100H is determined as being present in any of the own vehicle traveling lane and the one or two own vehicle adjacent lanes in the rear region of the vehicle 1 in step S140 (step S140: YES), the lane-change performability determining unit 15 may proceed to a process in step S150.

In step S150, the lane-change performability determining unit 15 may determine whether any vehicle that is traveling at a speed lower than that of the high-speed vehicle 100H is present in a front region of the high-speed vehicle 100H in a lane in which the high-speed vehicle 100H is traveling. Hereinafter, the vehicle that is traveling at the speed lower than that of the high-speed vehicle 100H may be referred to as a "low-speed vehicle 101". The low-speed vehicle 101 may encompass the vehicle 1 in addition to one or more other vehicles 100 that are lower in speed than the high-speed vehicle 100H. Further, the lane in which the high-speed vehicle 100H is traveling may be referred to as a "high-speed vehicle traveling lane".

On a condition that no low-speed vehicle 101 is determined as being present in the front region of the high-speed vehicle 100H in the high-speed vehicle traveling lane in step S150 (step S150: NO), the lane-change performability determining unit 15 may proceed to the process in step S160. In step S160, the lane-change performability determining unit 15 may determine that the lane change of the vehicle 1 into the high-speed vehicle traveling lane is non-performable. In step S160, the lane-change performability determining unit 15 may also determine that the lane change of the vehicle 1 into any lane other than the high-speed vehicle traveling lane is performable.

In a case where no low-speed vehicle 101 is present in the front region of the high-speed vehicle 100H in the high-speed vehicle traveling lane, it may be expected that the high-speed vehicle 100H continues to travel without performing a lane change. Therefore, in step S160, the lane-change performability determining unit 15 may prohibit the vehicle 1 only from performing a lane change into the high-speed vehicle traveling lane, i.e., the lane in which the high-speed vehicle 100H that is higher in speed than the vehicle 1 is traveling.

Figure 5:
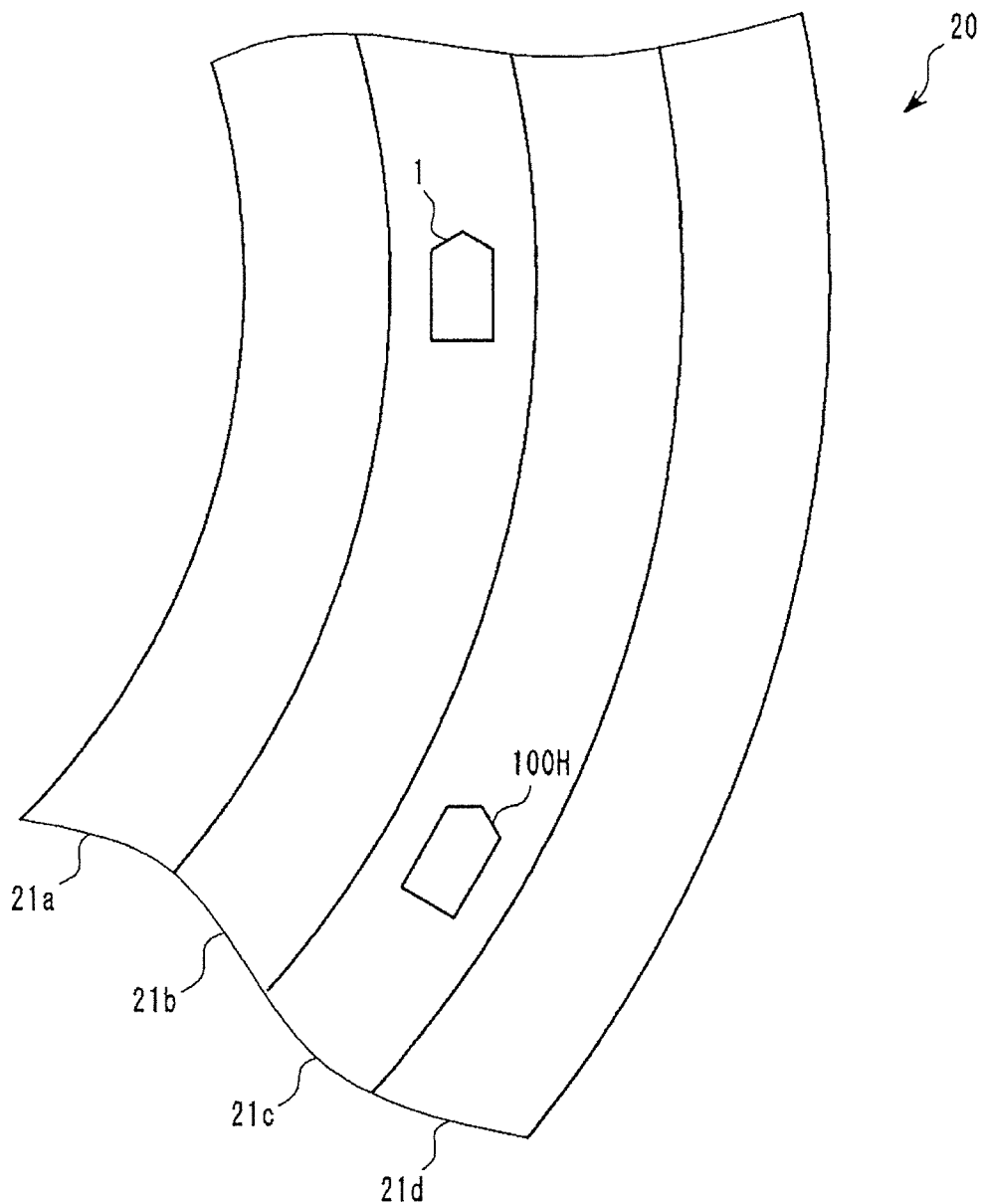
FIG. 5 is a diagram illustrating an example of a situation under which a process in step S160 may be performed.

FIG. 5 illustrates an example situation where the vehicle 1 is traveling in the second lane 21b, and the high-speed vehicle 100H is traveling in the third lane 21c. In this example situation, the lane change of the vehicle 1 into the third lane 21c may be prohibited and the lane change of the vehicle 1 into the first lane 21a may be permitted in step S160.

In contrast, on a condition that the low-speed vehicle 101 is determined as being present in the front region of the high-speed vehicle 100H in the high-speed vehicle traveling lane in step S150 (step S150: YES), the lane-change performability determining unit 15 may proceed to a process in step S170.

In step S170, the lane-change performability determining unit 15 may determine whether the low-speed vehicle 101 is present in the front region of the high-speed vehicle 100H in every one of the one or two lanes adjacent to the high-speed vehicle traveling lane. Hereinafter, the lane adjacent to the high-speed vehicle traveling lane may be referred to as a "high-speed vehicle adjacent lane". In other words, a determination may be made in step S170 as to whether the low-speed vehicle 101 that is lower in speed than the high-speed vehicle 100H is traveling in every one of the high-speed vehicle traveling lane and the one or two high-speed vehicle adjacent lanes.

On a condition that the low-speed vehicle 101 is determined as being present in the front region of the high-speed vehicle 100H in every one of the one or two high-speed vehicle adjacent lanes in step S170 (step S170: YES), the lane-change performability determining unit 15 may proceed to the process in step S160.

In step S160, the lane-change performability determining unit 15 may determine that the lane change of the vehicle 1 into the high-speed vehicle traveling lane is non-performable, as described above. Further, in step S160, the lane-change performability determining unit 15 may also determine that the lane change of the vehicle 1 into any lane other than the high-speed vehicle traveling lane is performable.

On a condition that the low-speed vehicle 101 is present in the front region of the high-speed vehicle 100H in every one of the high-speed vehicle traveling lane and the one or two high-speed vehicle adjacent lanes, it may be expected that the high-speed vehicle 100H continues to travel in the same lane without overtaking any of the one or more low-speed vehicles 101. Therefore, in step S160, the lane-change performability determining unit 15 may prohibit the vehicle 1 only from performing the lane change into the high-speed vehicle traveling lane, i.e., the lane in which the high-speed vehicle 100H that is higher in speed than the vehicle 1 is traveling.

Figure 6:
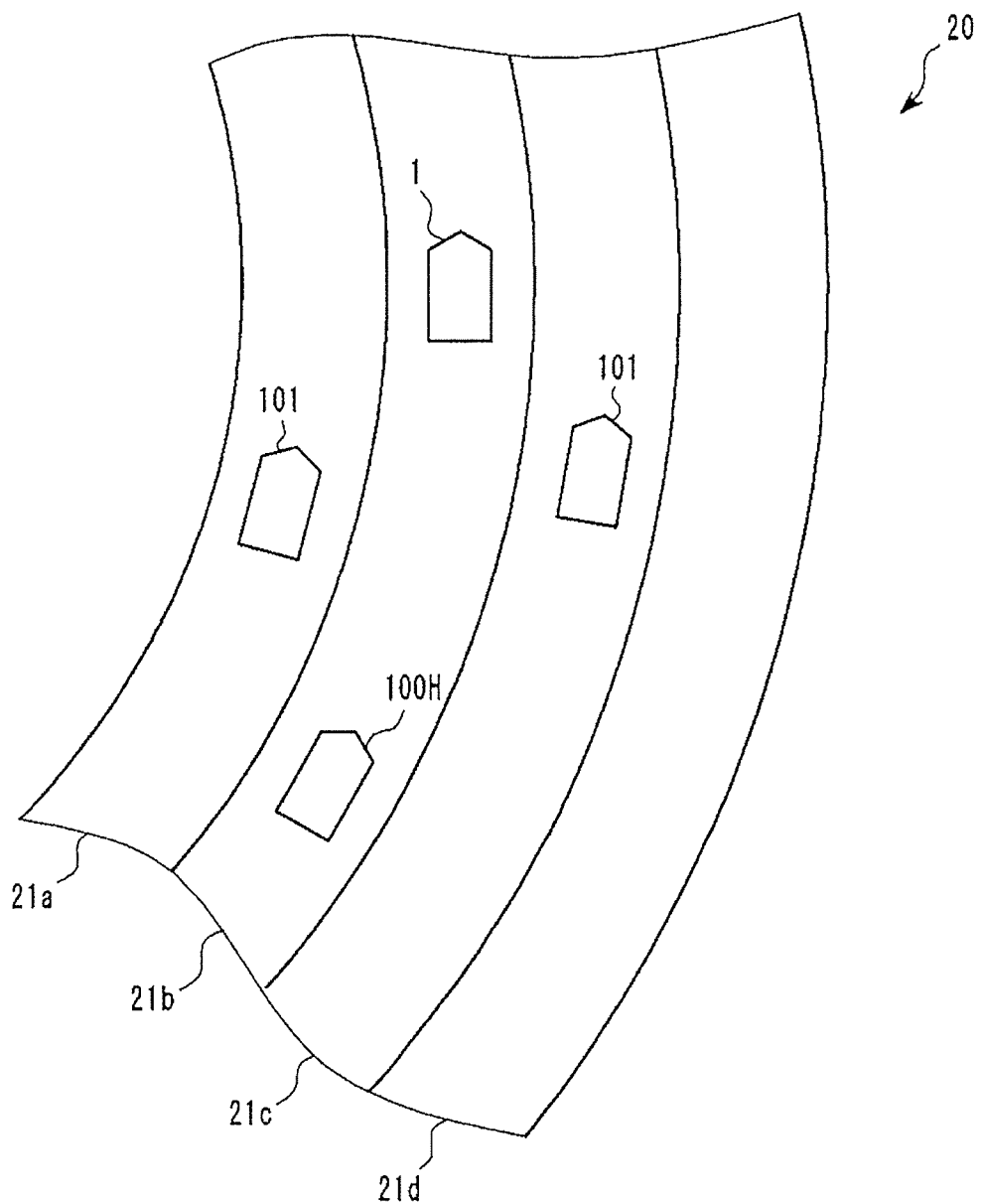
FIG. 6 is a diagram illustrating another example of the situation under which the process in step S160 may be performed.

FIG. 6 illustrates an example situation where the vehicle 1 is traveling in the second lane 21b, the high-speed vehicle 100H is also traveling in the second lane 21b, and the low-speed vehicle 101 is traveling in each of the first lane 21a and the third lane 21c. In this example situation, the lane change of the vehicle 1 into any of the first lane 21a and the third lane 21c may be permitted in step S160.

In contrast, on a condition that no low-speed vehicle 101 is determined as being present in the front region of the high-speed vehicle 100H in at least one of the one or two high-speed vehicle adjacent lanes in step S170 (step S170: NO), the lane-change performability determining unit 15 may proceed to a process in step S180.

In step S180, the lane-change performability determining unit 15 may determine that: the lane change of the vehicle 1 into the high-speed vehicle traveling lane is non-performable; the lane change of the vehicle 1 into the lane in which no low-speed vehicle 101 is present in the front region of the high-speed vehicle 100H out of the one or two high-speed vehicle adjacent lanes is non-performable; and the lane change of the vehicle 1 into any lane other than the foregoing lanes is performable.

In other words, on the condition that the low-speed vehicle 101 is present in the front region of the high-speed vehicle 100H in the high-speed vehicle traveling lane, the lane change of the vehicle 1 into the high-speed vehicle traveling lane may be prohibited, and further, the lane change of the vehicle 1 into any lane, in which no low-speed vehicle 101 is present, of the one or two high-speed vehicle adjacent lanes may be prohibited.

On a condition that the low-speed vehicle 101 is present in the front region of the high-speed vehicle 100H in the high-speed vehicle traveling lane, and the one or two high-speed vehicle adjacent lanes include a lane in which no low-speed vehicle 101 is present in the front region of the high-speed vehicle 100H, the high-speed vehicle 100H may possibly continue to travel in the same lane, or may possibly perform a lane change into any, of the high-speed vehicle adjacent lanes in which no low-speed vehicle 101 is present, in order to overtake the low-speed vehicle 101. Therefore, in step S180, the lane-change performability determining unit 15 may prohibit the vehicle 1 from performing the lane change into the high-vehicle traveling lane, and from performing the lane change into the lane in which no low-speed vehicle 101 is present out of the one or two high-speed vehicle adjacent lanes.

Figure 7:
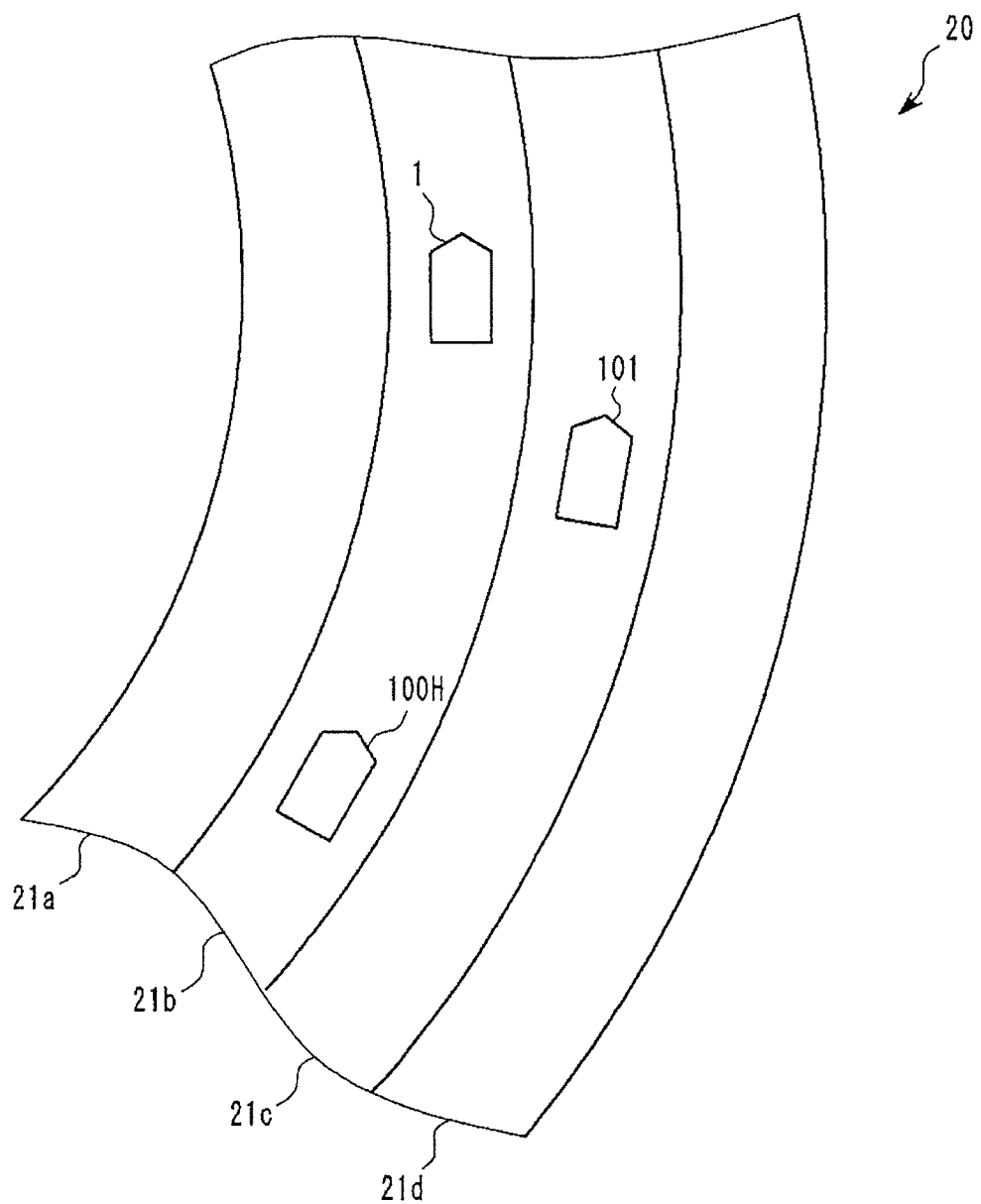
FIG. 7 is a diagram illustrating an example of a situation under which a process in step S180 may be performed.

FIG. 7 illustrates an example situation where the vehicle 1 is traveling in the second lane 21b, the high-speed vehicle 100H is also traveling in the second lane 21b, and the low-speed vehicle 101 is traveling in the third lane 21c. In this example situation, the lane change of the vehicle 1 into the first lane 21*a* may be prohibited and the lane change of the vehicle 1 into the third lane 21*c* may be permitted in step S180.

As described above, the lane-change performability determining unit 15 may determine whether the lane change of the vehicle 1 is performable, on the basis of: the information regarding which lane the other vehicle 100 is traveling in; the relative speed of the other vehicle 100 with respect to the vehicle 1; and the separation distance from the other vehicle 100 to the vehicle 1. The information regarding which lane the other vehicle 100 is traveling in may be determined by the other-vehicle traveling-lane determining unit 14. The relative speed of the other vehicle 100 with respect to the vehicle 1, and the separation distance from the other vehicle 100 to the vehicle 1 may be detected by the radar unit 3*b*.

The travel assist apparatus 10 according to an example implementation of the technology described above may include the rear lane shape calculator 13 that calculates the lane shape in the section from the current position of the vehicle 1 to the rear position located in the rear region of the vehicle 1 and away from the current position of the own vehicle 1 by the predetermined distance, on the basis of the lane information group and the traveling trajectory of the vehicle 1. The lane information group includes a plurality of pieces of lane information detected on the basis of the plurality of images captured successively during the data acquisition period. The data acquisition period is a predetermined period from a current time to a certain time in past. The traveling trajectory of the vehicle 1 is a trajectory of traveling of the vehicle 1 during the data acquisition period and is calculated on the basis of the result of the detection by both the vehicle speed sensor 4*a* and the yaw-rate sensor 4*b* during the data acquisition period. The travel assist apparatus 10 with such a configuration is able to determine the lane in which the follower vehicle recognized by the radar unit 3*b* is traveling even when the relevant lane is on a curved road. It is therefore possible for the travel assist apparatus 10 to correctly determine whether the lane change of the vehicle 1 is performable on the basis of the result of the foregoing determination. It is therefore possible to improve user-friendliness according to the travel assist apparatus 10 according to an example implementation of the technology.

According to one implementation of the technology, it is possible for a travel assist apparatus that recognizes a follower vehicle by means of a radar unit to determine a lane in which the follower vehicle is traveling.

Each of the controller 11, the lane information detector 12, the rear lane shape calculator 13, the other-vehicle traveling-lane determining unit 14, and the lane-change performability determining unit 15 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the controller 11, the lane information detector 12, the rear lane shape calculator 13, the other-vehicle traveling-lane determining unit 14, and the lane-change performability determining unit 15 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the controller 11, the lane information detector 12, the rear lane shape calculator 13, the other-vehicle traveling-lane determining unit 14, and the lane-change performability determining unit 15 illustrated in FIG. 1.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A travel assist apparatus comprising:
  a detector configured to at least recognize, on a basis of a road sign in an image, an own vehicle traveling lane and one or two own vehicle adjacent lanes, and detect lane information including information regarding relative positions, of the own vehicle traveling lane and all of the one or two own vehicle adjacent lanes, with respect to an own vehicle in a vehicle width direction, the image being captured by an imaging unit that captures a front region of the own vehicle, the own vehicle traveling lane being a lane in which the own vehicle is traveling, the one or two own vehicle adjacent lanes each being a lane adjacent to the own vehicle traveling lane;
  a calculator configured to calculate rear lane shape information on a basis of a lane information group and a traveling trajectory of the own vehicle, the lane information group including a plurality of pieces of the lane information detected on a basis of a plurality of images captured by the imaging unit successively during a data acquisition period, the data acquisition period being a predetermined period from a current time to a certain time in past, the traveling trajectory of the own vehicle being a trajectory of traveling of the own vehicle during the data acquisition period and being calculated on a basis of a result of detection of both a vehicle speed of the own vehicle and a yaw rate of the own vehicle during the data acquisition period, the rear lane shape information including information regarding shapes of the own vehicle traveling lane and all of the one or two own vehicle adjacent lanes in a section that covers from a current position of the own vehicle to a rear position, the rear position being located in a rear region of the own vehicle and is away from the current position of the own vehicle by a predetermined distance;
  a first determining unit configured to determine which of the own vehicle traveling lane and all of the one or two own vehicle adjacent lanes another vehicle is traveling in, on a basis of a comparison between the rear lane shape information and a relative position of the other vehicle with respect to the own vehicle, the relative position of the other vehicle with respect to the own vehicle being detected by a radar unit having a recognizable range covering the rear region of the own vehicle; and a second determining unit configured to determine whether a lane change of the own vehicle is performable, on a basis of information indicating a result of the determination made by the first determining unit, a relative speed of the other vehicle with respect to the own vehicle, and a separation distance from the other vehicle to the own vehicle, the relative speed and the separation distance being detected by the radar unit.

2. The travel assist apparatus according to claim 1, wherein the calculator interpolates, when the data acquisition period includes a measurement error period, the lane information for the measurement error period on a basis of the lane information detected before the measurement error period, the measurement error period being a period in which the lane information is undetectable by the detector.

3. The travel assist apparatus according to claim 2, wherein, in a situation in which a high-speed vehicle is present within a predetermined distance in the rear region of the own vehicle on any of the own vehicle traveling lane and the one or two own vehicle adjacent lanes, the high-speed vehicle being traveling closer to the own vehicle at a relative speed equal to or higher than a predetermined relative speed,
the second determining unit determines that the lane change of the own vehicle into any of the one or two own vehicle adjacent lanes is performable, on a condition that a low-speed vehicle is present in each of a high-speed vehicle traveling lane and one or two high-speed vehicle adjacent lanes in a front region of the high-speed vehicle, the high-speed vehicle traveling lane being a lane in which the high-speed vehicle is traveling, the one or two high-speed vehicle adjacent lanes each being a lane adjacent to the high-speed vehicle traveling lane, the low-speed vehicle being any of the own vehicle and the other vehicle that are lower in speed than the high-speed vehicle,
the second determining unit determines that the lane change of the own vehicle into the high-speed vehicle traveling lane is non-performable, on a condition that the low-speed vehicle is not present in the high-speed vehicle traveling lane in the front region of the high-speed vehicle, and
the second determining unit determines that the lane change of the own vehicle into a certain lane is non-performable, on a condition that the low-speed vehicle is present in the high-speed vehicle traveling lane in the front region of the high-speed vehicle and the low-speed vehicle is not present in at least one of the one or two high-speed vehicle adjacent lanes in the front region of the high-speed vehicle, the certain lane being a lane that is any of the one or two high-speed vehicle adjacent lanes in the front region of the high-speed vehicle, and in which the low-speed vehicle is not present.

4. The travel assist apparatus according to claim 1, wherein, in a situation in which a high-speed vehicle is present within a predetermined distance in the rear region of the own vehicle on any of the own vehicle traveling lane and the one or two own vehicle adjacent lanes, the high-speed vehicle being traveling closer to the own vehicle at a relative speed equal to or higher than a predetermined relative speed,
the second determining unit determines that the lane change of the own vehicle into any of the one or two own vehicle adjacent lanes is performable, on a condition that a low-speed vehicle is present in each of a high-speed vehicle traveling lane and one or two high-speed vehicle adjacent lanes in a front region of the high-speed vehicle, the high-speed vehicle traveling lane being a lane in which the high-speed vehicle is traveling, the one or two high-speed vehicle adjacent lanes each being a lane adjacent to the high-speed vehicle traveling lane, the low-speed vehicle being any of the own vehicle and the other vehicle that are lower in speed than the high-speed vehicle,
the second determining unit determines that the lane change of the own vehicle into the high-speed vehicle traveling lane is non-performable, on a condition that the low-speed vehicle is not present in the high-speed vehicle traveling lane in the front region of the high-speed vehicle, and
the second determining unit determines that the lane change of the own vehicle into a certain lane is non-performable, on a condition that the low-speed vehicle is present in the high-speed vehicle traveling lane in the front region of the high-speed vehicle and the low-speed vehicle is not present in at least one of the one or two high-speed vehicle adjacent lanes in the front region of the high-speed vehicle, the certain lane being a lane that is any of the one or two high-speed vehicle adjacent lanes in the front region of the high-speed vehicle, and in which the low-speed vehicle is not present.

5. A travel assist apparatus comprising
circuitry configured to
at least recognize, on a basis of a road sign in an image, an own vehicle traveling lane and one or two own vehicle adjacent lanes, and detect lane information including information regarding relative positions, of the own vehicle traveling lane and all of the one or two own vehicle adjacent lanes, with respect to an own vehicle in a vehicle width direction, the image being captured by an imaging unit that captures a front region of the own vehicle, the own vehicle traveling lane being a lane in which the own vehicle is traveling, the one or two own vehicle adjacent lanes each being a lane adjacent to the own vehicle traveling lane,
calculate rear lane shape information on a basis of a lane information group and a traveling trajectory of the own vehicle, the lane information group including a plurality of pieces of the lane information detected on a basis of a plurality of images captured by the imaging unit successively during a data acquisition period, the data acquisition period being a predetermined period from a current time to a certain time in past, the traveling trajectory of the own vehicle being a trajectory of traveling of the own vehicle during the data acquisition period and being calculated on a basis of a result of detection of both a vehicle speed of the own vehicle and a yaw rate of the own vehicle during the data acquisition period, the rear lane shape information including information regarding shapes of the own vehicle traveling lane and all of the one or two own vehicle adjacent lanes in a section that covers from a current position of the own vehicle to a rear position, the rear position being located in a rear region of the own vehicle and is away from the current position of the own vehicle by a predetermined distance,
determine which of the own vehicle traveling lane and all of the one or two own vehicle adjacent lanes another vehicle is traveling in, on a basis of a comparison between the rear lane shape information and a relative position of the other vehicle with respect to the own vehicle, the relative position of the other vehicle with respect to the own vehicle being detected by a radar unit having a recognizable range covering the rear region of the own vehicle, and
determine whether a lane change of the own vehicle is performable, on a basis of information indicating a result of the determination made as to which of the own vehicle traveling lane and all of the one or two own vehicle adjacent lanes another vehicle is traveling in, a relative speed of the other vehicle with respect to the own vehicle, and a separation distance from the other vehicle to the own vehicle, the relative speed and the separation distance being detected by the radar unit.

* * * * *